(12) United States Patent
David et al.

(10) Patent No.: US 11,313,414 B2
(45) Date of Patent: Apr. 26, 2022

(54) SYSTEM FOR MOUNTING AN ANNULAR COMPONENT ON A SHAFT

(71) Applicant: Aktiebolaget SKF, Gothenburg (SE)

(72) Inventors: Sebastien David, Ouderkerk a/d Amstel (NL); Mark Ely, Nieuwegein (NL)

(73) Assignee: Aktiebolaget SKF, Gothenburg (SE)

( * ) Notice: Subject to any disclaimer, the term of this patent is extended or adjusted under 35 U.S.C. 154(b) by 121 days.

(21) Appl. No.: 16/850,603

(22) Filed: Apr. 16, 2020

(65) Prior Publication Data

US 2020/0240472 A1 Jul. 30, 2020

Related U.S. Application Data

(63) Continuation of application No. 15/005,243, filed on Jan. 25, 2016, now abandoned.

(30) Foreign Application Priority Data

Jan. 29, 2015 (GB) ...................................... 1501456
Jan. 29, 2015 (GB) ...................................... 1501459

(51) Int. Cl.
*F16C 35/063* (2006.01)
*F04B 49/06* (2006.01)
(Continued)

(52) U.S. Cl.
CPC .......... *F16C 35/063* (2013.01); *F04B 49/065* (2013.01); *F04B 2205/05* (2013.01);
(Continued)

(58) Field of Classification Search
CPC ...... F16C 35/063; F16C 23/086; F16C 19/38; F16C 35/078; F16C 2226/12;
(Continued)

(56) References Cited

U.S. PATENT DOCUMENTS 5,685,068 A 11/1997 Bankestroem et al.
5,779,419 A 7/1998 Kellstrom et al.
(Continued)

FOREIGN PATENT DOCUMENTS

DE 102005059982 B3 7/2007
DE 102010048250 A1 4/2012
(Continued)

*Primary Examiner* — James J Lee
*Assistant Examiner* — Shon G Foley
(74) *Attorney, Agent, or Firm* — Garcia-Zamor Intellectual Property Law; Ruy Garcia-Zamor; Bryan Peckjian

(57) ABSTRACT

A system for mounting an annular component on a shaft, comprising (a) a hydraulic nut having an annular coaxial cavity and a ring-like piston, displaceable within the cavity; (b) a displacement sensor for providing a displacement signal indicating the axial displacement of the piston within the cavity; (c) a wireless displacement transmitter for transmitting the displacement signal; (d) a pressure sensor for providing a pressure signal indicating a pressure within the cavity; (e) a wireless pressure transmitter for transmitting the pressure signal; (f) a pump arranged to pump fluid into the cavity; and (g) a remote control device having a communications device arranged to receive transmitted pressure and displacement signals, wherein the remote control device is arranged to output control information for controlling the pump.

19 Claims, 3 Drawing Sheets

(51) Int. Cl.
  *G05B 19/46*  (2006.01)
  *F16C 23/08*  (2006.01)
  *F16C 19/38*  (2006.01)

(52) U.S. Cl.
  CPC ............ *F16C 19/38* (2013.01); *F16C 23/086* (2013.01); *G05B 19/46* (2013.01); *G05B 2219/41307* (2013.01)

(58) Field of Classification Search
  CPC .... F04B 49/065; F04B 2205/05; G05B 19/46; G05B 2219/41307
  See application file for complete search history.

(56) References Cited

U.S. PATENT DOCUMENTS

| | | |
|---|---|---|
| 2004/0130086 A1 | 7/2004 | Kawakami |
| 2007/0128046 A1 | 6/2007 | Gonnella et al. |
| 2007/0128047 A1 | 6/2007 | Gonnella et al. |
| 2011/0029156 A1 | 2/2011 | Vernacchia et al. |
| 2013/0227414 A1 | 8/2013 | Hwang et al. |
| 2015/0053746 A1 | 2/2015 | Shelton, IV et al. |
| 2015/0371168 A1 | 12/2015 | Karabin |
| 2016/0131129 A1 | 5/2016 | Chen |
| 2016/0169223 A1 | 6/2016 | Paul et al. |

FOREIGN PATENT DOCUMENTS

| | | |
|---|---|---|
| EP | 0718515 A1 | 6/1996 |
| WO | 2007/067344 A2 | 6/2007 |
| WO | 2014/154259 A1 | 10/2014 |

SYSTEM FOR MOUNTING AN ANNULAR COMPONENT ON A SHAFT

CROSS REFERENCE TO RELATED APPLICATIONS

This application is a Continuation of (U.S.) patent application Ser. No. 15/005,243, filed Jan. 25, 2016, which claims the benefit of Great Britain (GB) Patent Application Number 1501456.6, filed on 29 Jan. 2015, and Great Britain (GB) Patent Application Number 1501459.0, also filed on 29 Jan. 2015, all of which are incorporated herein by reference in their entireties.

TECHNICAL FIELD OF THE INVENTION

The invention is related to the subject of mounting annular components, for example bearings, on a shaft. In particular, the invention can be used for mounting components having a conical bore on a complementarily-shaped shaft section.

BACKGROUND OF THE INVENTION

An example of this field is the mounting of a bearing on a frusta-conical seating. In the process of mounting such objects, internal stresses are generated whereby an interference fit is obtained. The conical object is stretched, whereas the shaft is compressed. The objects concerned may comprise various engineering or machinery components, such as gears, bearings, etc.

Although high internal stresses lead to a correct interference fit, care should be taken not to overload the objects in order to avoid creep and the development of cracks. On the other hand, low stresses are to be avoided as well, having regard to the problems of fretting or stress corrosion.

SUMMARY OF THE INVENTION

The Applicant has previously presented a method, in U.S. Pat. No. 5,779,419, for mounting an annular component having a conically-shaped opening on a conical shaft, which provides a predictable result. That method comprises the steps of: installing the hollow object on the shaft so as to bring the conically shaped surfaces of the object and shaft into abutting relationship; driving the annular component to a start position for providing an initial interference fit; and driving the component over a predetermined distance from the initial position to a final position for providing a final interference fit. This approach relies upon the correct intervention of a user in actuating a pump with reference to tabulated data so as to obtain the desired initial abutting force and subsequent desired displacement. The Applicant has discovered that the operator's inaccuracy is exacerbated by the inaccuracy of the typical gauges used to measure the pressure and displacement, and also by the inaccuracy of the manual actuation of the hand pump typically used to provide the desired pressure.

According to the invention, a system is provided by which the annular component may be mounted more accurately, faster, and with less reliance upon the operator.

Typically, the component will be a bearing, such as a rolling element bearing.

BRIEF DESCRIPTION OF THE DRAWINGS

For a better understanding of the invention, and to show how the same may be put into effect, reference will now be made, by way of example only, to the accompanying drawings in which.

DETAILED DESCRIPTION OF SOME EMBODIMENTS

Figure 1:
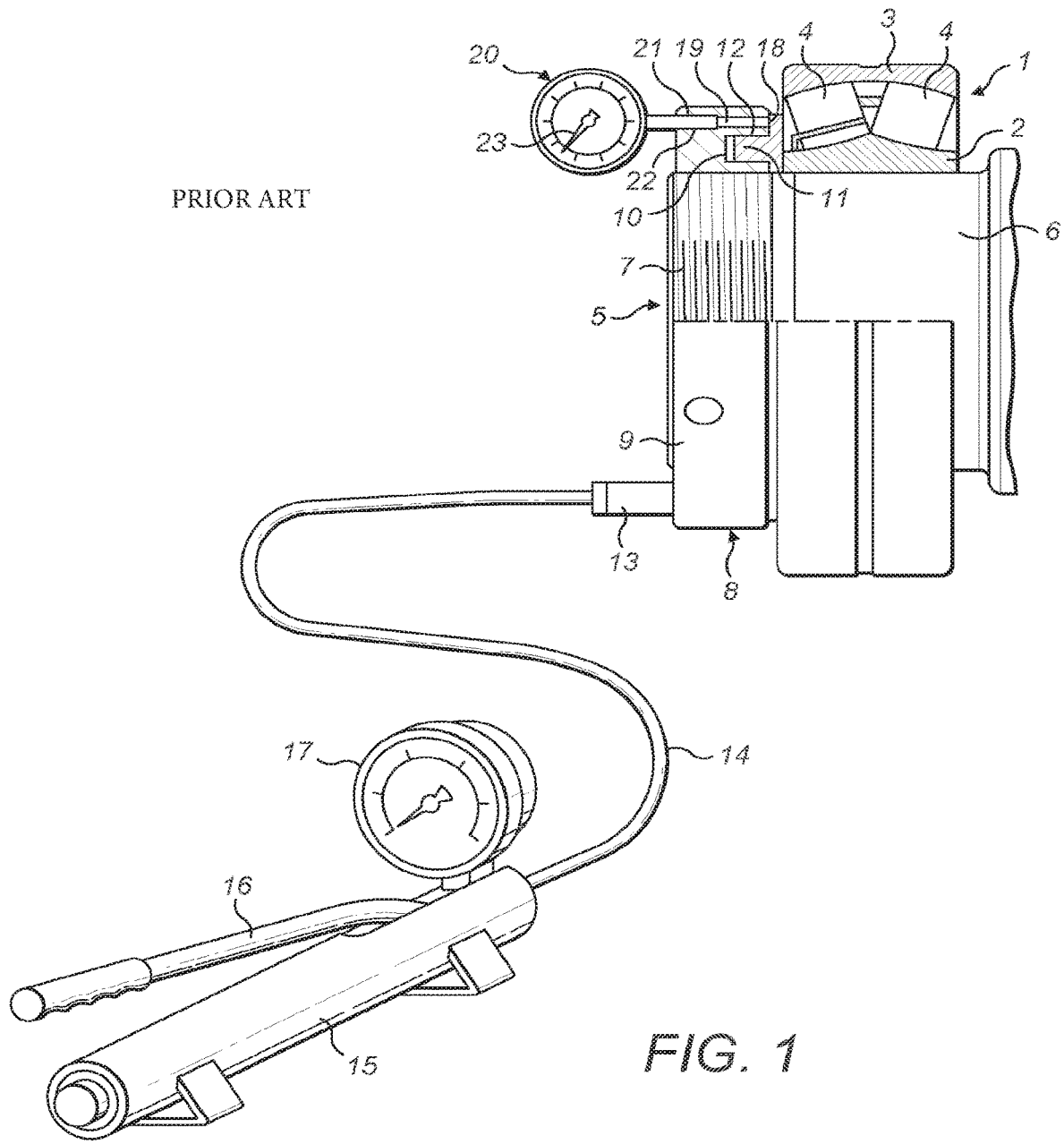
FIG. 1 shows a prior art arrangement for use by an operator.

FIG. 1 shows a spherical roller bearing 1, comprising an inner race 2, which has a conically shaped bore, an outer race 3 with a spherical raceway, as well as two rows of rollers 4. The spherical roller bearing 1 is being mounted on stub 5, comprising a conically shaped part 6, as well as a screw threaded part 7. A hydraulic nut 8 has been screwed onto the screw threaded part 7. This hydraulic nut 8 comprises a nut body 9 and which has a coaxial annular chamber 10. In the chamber 10 a ring-like piston 11 has been slidingly accommodated. By means of seals 12, the piston 11 has been sealed with respect to the cylindrical walls of chamber 10. By means of connector 13, chamber 10 is connected to a hydraulic hose 14, which in turn is connected to a hydraulic hand pump 15. The oil can be pumped from pump 15 by moving handle 16 up and down. Gauge 17 shows the oil pressure. As shown in FIG. 1, piston 11 rests against inner race 2 of spherical roller bearing 1. By pumping oil into chamber 10, ring 2 is driven up the conically shaped part 6 of stub 5. Piston 11 also has a radially outwardly pointing flange 18, against which measuring pin 19 rests. This pin forms part of distance measuring device 20, which contains a screw threaded housing 21 screwed into bore 22 provided in nut body 9. Dial indicator 23 is connected to the axially movable pin 19, so as to enable the measurement of the relative axial displacement between nut body 9 and piston 11.

Figure 2:
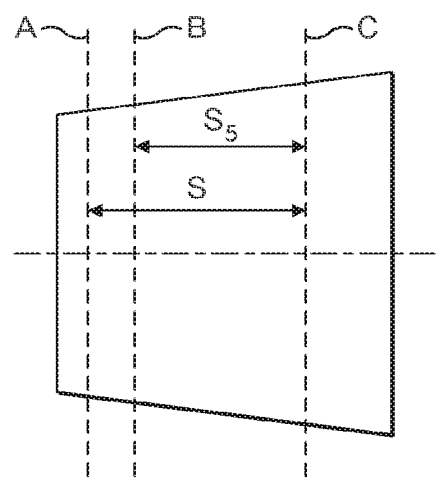
FIG. 2 shows a schematic representation of the steps of the prior art method.

In the process of mounting the spherical roller bearing 1 onto stub 5, bearing 1, in particular inner race 2 thereof, is slid over stub 5 until the conically shaped surfaces of inner race 2 and stub 5 abut each other. At that position, no or hardly any clamping action exists yet. This position of spherical roller bearing is indicated with A (zero position) in FIG. 2. Subsequently, the inner race 2 is driven up to the start position B, by pumping oil into chamber 10 of hydraulic nut 8. Once the start position B has been reached, the inner race 2 is driven up over a distance Ss towards final position C. With reference S, the distance between the position wherein the bearing is placed by hand and the final position has been indicated.

Figure 3:
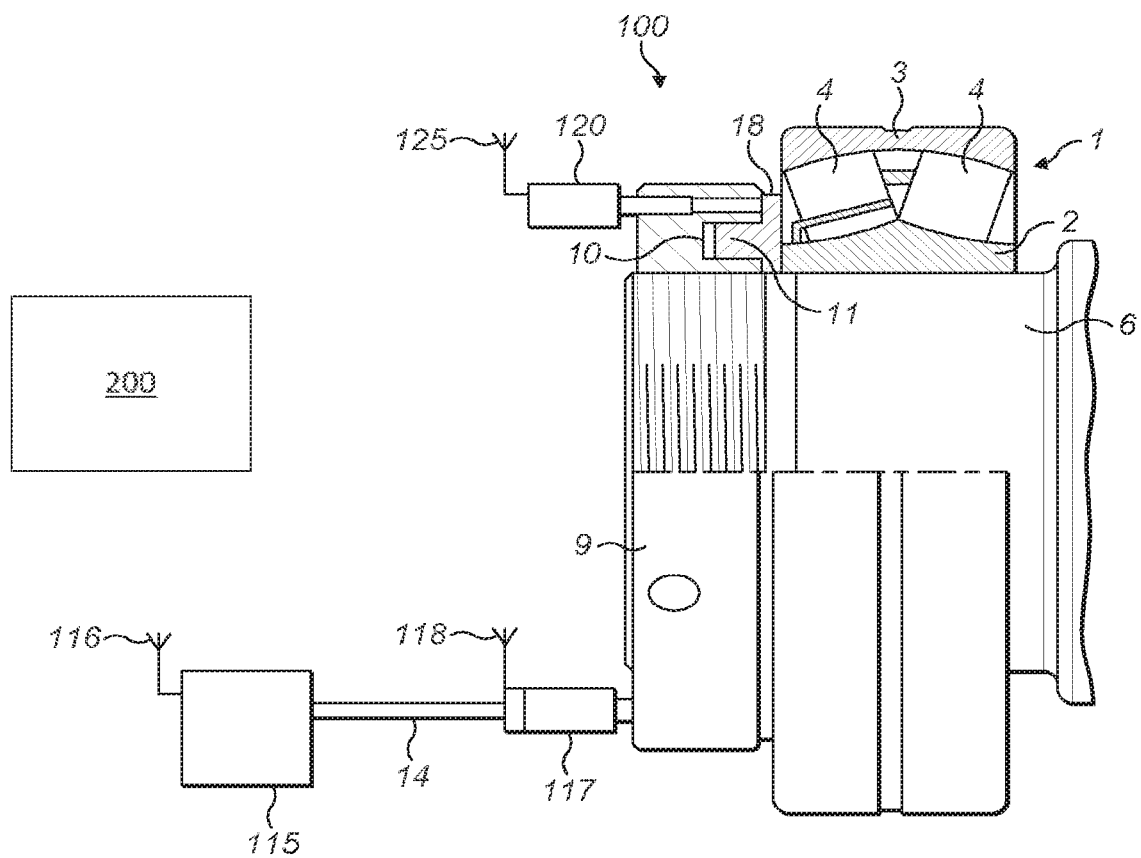
FIG. 3 shows an embodiment of the invention.

FIG. 3 shows an embodiment of a system of the invention comprising a hydraulic nut 100, a pump 115, and a remote control device 200. In FIG. 3, items similar to those of FIG. 1 have been shown with the same reference numerals.

The pump 115 may be a hand pump, a power-assisted pump and/or an electrically-operated pump.

The hydraulic nut 100 is arranged to be fixedly mounted on the shaft, for example by being clamped to the shaft, or by being screwed onto a thread on the shaft.

The hydraulic nut 100 comprises a nut body 9 which has a coaxial annular chamber 10. In the chamber 10 a ring-like piston 11 has been slidingly accommodated. Preferably, seals 12 are provided to seal the piston 11 with respect to the cylindrical walls of chamber 10.

Chamber 10 is connected to a hydraulic or pneumatic hose 14, which is connected to the pump 115. Fluid can be pumped from pump 115 into the chamber 10 via the hose 14.

The hydraulic nut 100 may comprise an electric pressure sensor 117 to provide an electrical signal indicative of the pressure within chamber 10. The pressure sensor 117 communicates wirelessly with other devices via wireless pressure transmitter 118. The wireless pressure transmitter 118 can communicate with other devices via Bluetooth or another wireless communication protocol as known in the art.

While the pressure sensor 117 and wireless transmitter 118 of this embodiment form part of the hydraulic nut 100, they may instead be provided as part of the pump 115 (since the pumping pressure represents the pressure in chamber 10), or as a separate device attached to the hose 14.

The pump 115 is arranged to pump fluid into chamber 10. This can provide force to drive ring 2 up the conically shaped part 6 of stub 5. In the depicted embodiment, the pump 115 comprises a wireless pump receiver 116 and is able to communicate wirelessly with other devices. Preferably, wireless pump receiver 116 can receive commands by which to control the pump 115 using other devices. The wireless pump receiver 116 can communicate with other devices via Bluetooth or another wireless communication protocol as known in the art.

In embodiments in which the pressure sensor 117 forms part of the pump 115, wireless pump receiver 116 and wireless pressure transmitter 118 may be a single communications device.

The hydraulic nut 100 comprises an electric distance measuring device 120 to provide an electrical signal indicative of the displacement of the piston 11 within chamber 10. The distance measuring device 120 communicates wirelessly with other devices via wireless displacement transmitter 125. The wireless displacement transmitter 125 can communicate with other devices via Bluetooth or another wireless communication protocol as known in the art.

Figure 4:
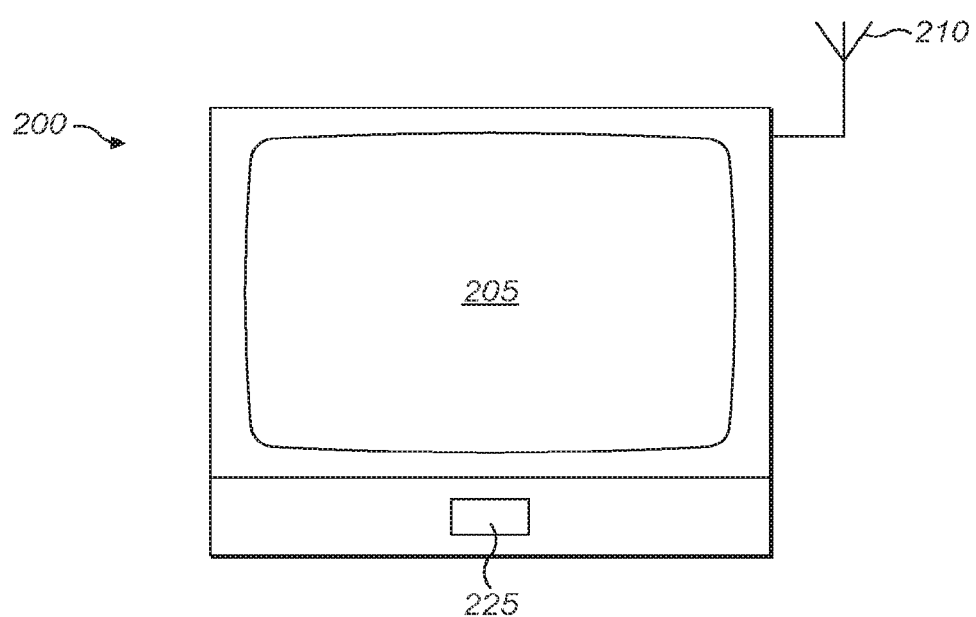
FIG. 4 shows a schematic representation of an example of a remote control device for use in the invention.

The remote control device 200, shown in more detail in FIG. 4, comprises: a display 205; a communication device 210; and input means 225. In some embodiments, the display 205 and input means 225 are provided collectively as a touch-screen 205, 225. The input means 225 is arranged to receive a user's input.

The communications device 210 is configured to wirelessly receive signals from the wireless pressure transmitter 118 and the wireless displacement transmitter 125. Preferably, the communications device 210 is configured to provide wireless control signals to the wireless pump receiver 116 for controlling the pump 115. For example, the communications device 210 can send user commands obtained from the input means 225 to the pump 115 for control thereof, e.g. to turn the pump on or off.

The display 205 is suitably configured to display an indicium representing the signals received by the communications device from the pressure transmitter 118 and the wireless displacement transmitter 125.

The remote control device 210 can be configured to display first information representing pressure in the chamber 10 and second information representing displacement of the piston 11.

Preferably, the remote control device 200 comprises a memory for storing data. The data may be inputted via the input means 225 or, alternatively, these may be accessed from a remote server.

The data may include one or more of: the mounting arrangement (e.g., whether with or without sleeve, and the sleeve type); the type of hydraulic nut; the bearing type; the clearance reduction; the number of previous mountings; the shaft material; and/or the shaft bore size (if applicable).

While in some embodiments, the inputted or accessed data may include the desired pressures and displacements for one or more types of component, in other embodiments, the desired pressure and displacement may be calculated using the remote control device 200 from the inputted or accessed data.

In some embodiments, the display 205 displays both the first information and the second information.

The indicator may vary in dependence upon the current pressure, initial pressure, and desired pressure, or in dependence upon current displacement, initial displacement, and desired displacement. In this way the indicator can represent either quantity in a simple, accurate and easily interpreted manner. Advantageously, this removes the burden from the operator of making reference to tables to determine how to operate the pump 115.

In general, the indicator may indicate the proportion of a range from an initial value to a desired value achieved by the pump 115 and hydraulic nut 100, irrespective of whether this is a pressure or a displacement.

In some embodiments, a first mode is provided in which the display 205 displays the first information and does not display the second information, and a second mode is provided in which the display 205 displays the second information and does not display the first information. Optionally, the display 205 may automatically switch from the first mode to the second mode (i.e., without requiring operator intervention). In such embodiments, the remote control device 210 may be configured to display a single indicator, which can represent the first information in the first mode and the second information in the second mode.

In some embodiments, the indicator is arranged to indicate the proportion of a range from an initial value of pressure to a desired value of pressure when the pressure is between the initial value of pressure and the desired value of pressure. Once the desired pressure has been achieved, the indicator can cease to indicate the proportion of pressure, and instead indicate the proportion of a range from an initial value of displacement to a desired value of displacement.

The indicator may be, for example, a progress bar that fills or a traffic light that turns from red to amber to green.

In preferred embodiments, the indicator is arranged to indicate the progress of the entire mounting procedure (i.e. both the stage of achieving the desired pressure and the subsequent stage of achieving the desired displacement). The operator may continue to actuate the pump 115 (whether by manual actuation, or electrically via the input means 225) until the indicator indicates the process has been completed. With such an indicator it may not be visible to the operator which stage (whether achieving the desired pressure or desired displacement) is currently being carried out.

The indicator may represent the progress such that the first half of the progression is from the initial value of pressure to the desired value of pressure and the second half of the progression is from the initial value of displacement to the desired value of displacement. In which case, the desired value of pressure will correspond with the initial value of displacement.

As a first example, the indicator may be a graphical representation of a bar that fills as the procedure progresses, in which the first half of the bar represents a range from the initial value of pressure to the desired value of pressure and the second half of the bar indicates the proportion of a range from the initial value of displacement to the desired value of displacement.

As a second example, the indicator may be a colored representation that changes color through a predetermined sequence of color from a start color via intermediate colors to an end color (e.g. from red to amber to green—the standard "traffic light" colors) as the procedure progresses.

The start color (e.g. green) may represent the initial value of pressure, the intermediate color (e.g. amber) may represent the desired value of pressure and the initial value of displacement, and the final color (e.g. red) may represent the desired value of displacement.

An operator may use the indicator displayed on the display 205 to establish when and how to actuate the pump 115 (whether by manual actuation, or electrically via the input means 225).

In a second embodiment, the system is configured such that the process of mounting a component, such as a bearing, can be triggered by a single start command issued by an operator, for example, via input means 225. Suitably, the start command is issued after data on the bearing and the mounting arrangement has been input using the input means 225.

For example, an operator would slide the bearing 1 over a conical shaft 5 until the conically shaped bore of the bearing 1 and the outer surface of the shaft 5 abut each other. At that position, there will be no or hardly any significant clamping action. The operator can then mount the hydraulic nut 100 on the shaft 5. This position of the bearing 1 is indicated with A (zero position) in FIG. 2.

The operator may then issue the start command, in response to which the remote control device 200 is programmed to carry out the following steps:

(1) Transmit a control signal to activate the pump 115. The control signal may be transmitted from the communications device 210 to the wireless pump receiver 116.

(2) Receive a pressure signal from the wireless pressure transmitter 118 using the communications device 210.

(3) Compare the received pressure signal with a pressure threshold. The pressure threshold can be either a threshold stored on the remote control device 210 or obtained from a remote server.

(4) When the received pressure signal reaches the pressure threshold, receive a first displacement signal from the wireless displacement transmitter 125. Indeed, the distance measuring device 120 may be inactive until this stage and only activated once the pressure threshold has been achieved. Similarly, the pressure sensor 117 may be deactivated when the threshold is reached. (Such communications may be effected via transmitters 116 and 125, which may also be receivers).

(5) Calculate a displacement threshold. This may be calculated, for example, by adding a desired displacement (Ss in FIG. 2) to the present displacement as indicated by the first displacement signal. The desired displacement can be either a threshold stored on the remote control device 210 or obtained from a remote server.

(6) Receive a further displacement signal (or continue to receive the same signal) from the wireless displacement transmitter 125. Once the pressure threshold has been achieved, the wireless displacement transmitter 125 may continue to transmit displacement signals.

(7) Compare the received further displacement signal with the displacement threshold.

(8) When the received displacement signal reaches the displacement threshold, transmit a control signal to deactivate the pump 115. The control signal may be transmitted from the communications device 210 to the wireless pump receiver 116.

(9) Provide an output signal (e.g. audibly, or via the display 205) after a predetermined amount of time. The predetermined amount of time can be either a threshold stored on the remote control device 210 or obtained from a remote server.

In response to step 1, the pump 115 will pump fluid into chamber 10 of hydraulic nut 100, thereby driving bearing 1 up to the start position B. Following step (4), position B will have been reached. Following step (8), the bearing 1 will have been driven up over a distance Ss and reached final position C. Between steps (8) and (9), any lubricant between the bearing 1 and the shaft 5 will egress.

The invention claimed is:

1. A method of automatically mounting a bearing, comprising the steps of:
   automatically mounting the bearing on a shaft using a system that comprises a remote control processor and a pump, the pump being configured to drive the bearing laterally along the shaft;
   the remote control processor being configured to receive, from a user, a single operating command which initiates the mounting of the bearing on the shaft by the system, wherein the remote control processor is configured to complete the mounting of the bearing on the shaft without requiring further input from the user after the provision of the single command;
   automatically and continually monitoring, by the remote control processor, a lateral distance of the bearing along the shaft as measured from an initial zero position;
   automatically and continually monitoring, by the remote control processor, of a pump pressure while the bearing is being mounted on the shaft; and
   completing the mounting of the bearing on the shaft such that the bearing is located at a final position without additional action by the user after the provision of the single operating command, wherein the remote control processor facilitate automatically mounting the bearing on the shaft without exceeding a stress threshold on an inner ring of the bearing.

2. The method of claim 1, wherein the step of providing the shaft further comprises the shaft having a conical surface onto which the bearing is mounted.

3. The method of claim 2, further comprising the step of the remote control processor comparing the pump pressure with a predetermined pressure threshold.

4. The method of claim 3, further comprising the step of a displaying progress of the pump from a start point by way of an intermediate point to a finish point, the pump operation progress effecting an increase in pressure from an initial value of pressure to a desired value of pressure that correlates to an increase in lateral displacement of the bearing along the shaft from the initial zero position to the final position.

5. The method of claim 4, further comprising the step of the remote control processor communicating with a remote server to determine the pressure threshold.

6. The method of claim 4, further comprising the steps of:
   providing a hydraulic nut under operation control of the remote control processor, the hydraulic nut having an annular coaxial cavity and a ring-like piston, displaceable within the annular coaxial cavity, the system further including a displacement sensor and a pressure sensor;
   the displacement sensor providing a displacement signal indicating the axial displacement of the ring-like piston within the annular coaxial cavity;
   providing a wireless displacement transmitter coupled to the displacement sensor for transmitting the displacement signal to the remote control processor;

providing the pressure sensor for providing a pressure signal indicating a pressure within the annular coaxial cavity; and providing a wireless pressure transmitter coupled to the pressure sensor for transmitting the pressure signal to the remote control processor, wherein the pump is configured to pump fluid into the annular coaxial cavity.

7. The method of claim 6, further comprising the step of the pump being in fluid communication with the annular coaxial cavity via a hose and providing fluid from the pump to the annular coaxial cavity, the pressure sensor being located on the hose.

8. The method of claim 7, further comprising the step of the remote control processor being configured to receive transmitted pressure and displacement signals via a communications device, the remote control processor comparing the pressure signal with the predetermined pressure threshold and outputting control information as a control signal for controlling the pump, the remote control processor further comprising a display arranged to display the pump operation progress.

9. The method of claim 8, wherein the step of providing the system further comprises a wireless pump receiver arranged to receive a pump control signal and control the pump.

10. The method of claim 9, wherein the step of completing the mounting of the bearing comprises the remote control processor being programmed to:
transmit the control signal to activate the pump;
receive the pressure signal from the wireless pressure transmitter;
compare the pressure signal with the pressure threshold;
when the received pressure signal reaches the pressure threshold, receive a first displacement signal from the wireless displacement transmitter and calculate a displacement threshold;
receive a further displacement signal from the wireless displacement transmitter;
compare the received further displacement signal with the displacement threshold; and
when the received displacement signal reaches the displacement threshold, transmit a control signal to deactivate the pump, and provide an alert after a predetermined amount of time.

11. The method of claim 10, wherein the start point corresponds to the initial value of pressure sensed by the pressure sensor, wherein the intermediate point corresponds to the desired value of pressure sensed by the pressure sensor and the initial value of displacement sensed by the displacement sensor; and wherein the final point corresponds to the desired value of displacement sensed by the displacement sensor.

12. The method of claim 11, wherein the outputted control information is constituted by the display to enable the pump operation progress to be continued until the final point is reached.

13. A method of automatically mounting a bearing, comprising the steps of:
automatically mounting the bearing on a shaft using a system that comprises a remote control processor and a pump;
the remote control processor being configured to receive, from a user, a single operating command which initiates the mounting of the bearing on the shaft by the system;
monitoring, by the remote control processor, a lateral distance of the bearing along the shaft as measured from an initial zero position;
monitoring, by the remote control processor, of a pump pressure while the bearing is being mounted on the shaft; and
completing the mounting of the bearing on the shaft such that the bearing is located at a final position without additional action by the user after the provision of the single operating command.

14. The method of claim 13, wherein the step of providing the shaft further comprises the shaft having a conical surface onto which the bearing is mounted.

15. The method of claim 14, further comprising the step of the remote control processor comparing the pump pressure with a predetermined pressure threshold.

16. The method of claim 15, further comprising the step of a displaying progress of the pump from a start point by way of an intermediate point to a finish point, the pump operation progress effecting an increase in pressure from an initial value of pressure to a desired value of pressure that correlates to an increase in lateral displacement of the bearing along the shaft from the initial zero position to the final position.

17. The method of claim 16, further comprising the step of the remote control processor communicating with a remote server to determine the pressure threshold.

18. The method of claim 16, further comprising the steps of:
providing a hydraulic nut under operation control of the remote control processor, the hydraulic nut having an annular coaxial cavity and a ring-like piston, displaceable within the annular coaxial cavity, the system further including a displacement sensor and a pressure sensor;
the displacement sensor providing a displacement signal indicating the axial displacement of the ring-like piston within the annular coaxial cavity;
providing a wireless displacement transmitter coupled to the displacement sensor for transmitting the displacement signal to the remote control processor;
providing the pressure sensor for providing a pressure signal indicating a pressure within the annular coaxial cavity; and
providing a wireless pressure transmitter coupled to the pressure sensor for transmitting the pressure signal to the remote control processor, wherein the pump is configured to pump fluid into the annular coaxial cavity.

19. The method of claim 18, further comprising the step of the pump being in fluid communication with the annular coaxial cavity via a hose and providing fluid from the pump to the annular coaxial cavity, the pressure sensor being located on the hose.

* * * * *